United States Patent
Matsuo et al.

(10) Patent No.: US 9,551,261 B2
(45) Date of Patent: Jan. 24, 2017

(54) UREA WATER SUPPLY SYSTEM

(71) Applicant: TOYOTA JIDOSHA KABUSHIKI KAISHA, Toyota-shi, Aichi-ken (JP)

(72) Inventors: Junichi Matsuo, Susono (JP); Nobumoto Ohashi, Shizuoka-ken (JP); Akira Mikami, Susono (JP); Keishi Takada, Kanagawa-ken (JP); Shigeki Nakayama, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/737,602

(22) Filed: Jun. 12, 2015

(65) Prior Publication Data

US 2015/0361858 A1  Dec. 17, 2015

(30) Foreign Application Priority Data

Jun. 12, 2014 (JP) ................... 2014-121579
May 25, 2015 (JP) ................... 2015-105675
Jun. 4, 2015 (JP) ................... 2015-114340

(51) Int. Cl.
  *F01N 3/00* (2006.01)
  *F01N 11/00* (2006.01)
  (Continued)

(52) U.S. Cl.
  CPC ............. *F01N 11/00* (2013.01); *F01N 3/2066* (2013.01); *F01N 3/2896* (2013.01);
  (Continued)

(58) Field of Classification Search
  USPC .............. 60/277, 286, 287, 288, 292, 295, 301, 60/303
  See application file for complete search history.

(56) References Cited

U.S. PATENT DOCUMENTS 5,461,857 A  10/1995  Itou et al.
6,125,629 A *  10/2000  Patchett ............. B01D 53/9431
                                                            60/284

(Continued)

FOREIGN PATENT DOCUMENTS

EP    2 660 436 A1    11/2013
JP    2010-7617       1/2010
JP    2014-1835       1/2014

OTHER PUBLICATIONS

Office Action issued in U.S. Appl. No. 14/736,687 on Mar. 31, 2016.
(Continued)

*Primary Examiner* — Binh Q Tran
(74) *Attorney, Agent, or Firm* — Finnegan, Henderson, Farabow, Garrett & Dunner, LLP

(57) ABSTRACT

An object is to suppress the occurrence of a failure in supply of urea water as much as possible in filling control of urea water in a pump share-type urea water supply system with two supply valves. In the pump share-type urea water supply system with a first supply valve and a second supply valve, a urea water tank is connected with the respective supply valves by a urea water supply path. The urea water supply path includes a first supply path for the first supply valve and a second supply path for the second supply valve. The second supply path has a larger capacity than the capacity of the first supply path by a predetermined volume. Filling control of urea water pressure-feeds urea water to the first supply valve and the first supply path by a pump operated in a specified operating state in a state that at least the first supply valve out of the first and second supply valves is opened, and closes the first supply valve based on a pressure value or a pressure variation per unit time obtained by an acquirer.

5 Claims, 7 Drawing Sheets

(51) Int. Cl.
   *F01N 3/20*   (2006.01)
   *F01N 3/28*   (2006.01)
   *F01N 13/00*  (2010.01)

(52) U.S. Cl.
   CPC ........ *F01N 13/0093* (2014.06); *F01N 13/011* (2014.06); *F01N 2610/02* (2013.01); *F01N 2610/144* (2013.01); *F01N 2610/148* (2013.01); *F01N 2610/1466* (2013.01); *F01N 2610/1493* (2013.01); *F01N 2900/1808* (2013.01); *F01N 2900/1822* (2013.01); *Y02T 10/24* (2013.01)

(56) References Cited

U.S. PATENT DOCUMENTS

| | | |
|---|---|---|
| 6,182,444 B1 | 2/2001 | Fulton et al. |
| 6,269,633 B1 | 8/2001 | van Nieuwstadt et al. |
| 6,293,097 B1 | 9/2001 | Wu et al. |
| 6,471,924 B1 | 10/2002 | Feeley et al. |
| 6,761,025 B1 | 7/2004 | Gladden |
| 7,021,048 B2 * | 4/2006 | Taylor, III ......... B01D 53/9431 422/169 |
| 7,954,313 B2 * | 6/2011 | Hirata .................. B01D 53/944 60/286 |
| 8,635,855 B2 * | 1/2014 | Mital ...................... F01N 3/035 60/274 |
| 8,997,461 B2 * | 4/2015 | Henry ..................... F01N 3/103 60/286 |
| 9,279,351 B2 * | 3/2016 | Dingle .................... F01N 3/021 |
| 2004/0118109 A1 | 6/2004 | Gladden |
| 2014/0000719 A1 | 1/2014 | Wright |

OTHER PUBLICATIONS

Notice of Allowance issued in U.S. Appl. No. 14/736,687 on Aug. 10, 2016.

* cited by examiner

UREA WATER SUPPLY SYSTEM

CROSS REFERENCE TO RELATED APPLICATIONS

This application claims priority to Japanese Patent Application No. 2014-121579 filed on Jun. 12, 2014, Japanese Patent Application No. 2015-105675 filed on May 25, 2015 and Japanese Patent Application No. 2015-114340 filed on Jun. 4, 2015, the entire contents of which are incorporated by reference herein.

BACKGROUND

Field of Invention

The present invention relates to a urea water supply system that supplies urea water to the exhaust emission for reduction of NOx using a selective reduction NOx catalyst provided in an exhaust passage of an internal combustion engine.

Description of the Related Art

A known configuration of an exhaust emission control device provides a selective reduction NOx catalyst (hereinafter simply referred to as "NOx catalyst") that reduces NOx included in the exhaust emission discharged from an internal combustion engine by using ammonia as a reducing agent. A supply valve is provided in the upstream of the NOx catalyst to supply urea water to the exhaust emission, in order to control the adsorption amount of ammonia on the NOx catalyst to a suitable condition for reduction of NOx. Urea water used for producing ammonia causes deposition of urea after vaporization of its water content. This may adversely affect components involved in supply of urea water, for example, the supply valve and a pump for pressure-feeding urea water.

For example, Patent Literature 1 describes the adverse effects of the released urea on the pump. More specifically, Patent Literature 1 has noted that urea depositing by vaporization of water after a stop of operation of the pump is likely to enter the clearance between components of the pump and cause a trouble and provides a configuration of making a continuous flow of urea water in the pump even after a stop of operation of the pump, in order to suppress deposition of urea.

CITATION LIST

Patent Literature

PTL 1: JP 2010-7617A
PTL 2: JP 2014-1835A

SUMMARY

A proposed technique provides two NOx catalysts placed in the exhaust passage for the purpose of removing NOx in the exhaust emission discharged from the internal combustion engine. The two NOx catalysts may be provided for various reasons, for example, providing two exhaust passages extended from an internal combustion engine or enhancing the efficiency of removal of NOx as much as possible. In any reason, in the technique of providing two NOx catalysts in the exhaust passage, one applicable configuration may place two supply valves corresponding to the two NOx catalysts for supplying ammonia efficiently to the respective NOx catalysts and supply the amount of urea water required for each NOx catalyst from the supply valve to the exhaust emission. In the above configuration of placing the two supply valves for supply of urea water, a pump used to pressure-feed the urea water to the respective supply valves may be shared by the respective supply valves, in order to reduce an increase in total number of components. The configuration of supplying urea water from a common pump to a plurality of supply valves is called "pump share-type" in the description below.

The urea included in urea water is the precursor of ammonia. When urea water is not supplied from the supply valve to the exhaust emission but remains in the supply valve or in a supply path connecting with the supply valve, ammonia may be produced from the remaining urea water by, for example, heat energy from the exhaust passage and accelerate corrosion of the supply valve or the supply path. The urea water filled in the supply valve and the supply path is thus required to be sucked back to a tank, when there is no need to continue supplying the urea water to the exhaust emission for the purpose of reduction of NOx. When supply of urea water to the exhaust emission is needed again, the supply valve and the supply path are filled with urea water again to prepare for resuming supply of urea water to the exhaust emission.

In the case that the configuration of filling urea water for the purpose of supply of ammonia to the NOx catalyst is applied to the pump share-type exhaust emission control device described above, the different capacities of the supply paths connecting with the respective supply valves may result in different filling behaviors of urea water in the respective supply paths. More specifically, the different capacities of the supply paths may cause a failure in supply of urea water (hereinafter may be simply referred to as "failure in supply"), for example, insufficient filling into one of the supply valves through one of the supply paths or leakage of urea water by excessive filling.

By taking into account the problems described above, an object of the invention is to suppress the occurrence of a failure in supply of urea water as much as possible in filling control of urea water in two supply paths in a pump share-type urea water supply system with two supply valves and two supply paths connecting with the respective supply valves.

In order to solve the above problems, the inventors have noted the open-close control of the two supply valves during operation of the pump in the pump share-type urea water supply system. Open-close control of the respective supply valves is required for moving and filling urea water by the operation of the pump in the supply path of urea water. More specifically, in order to move urea water by the pressure-feed capacity of the pump, the supply valve needs to be opened to set the internal pressure of the supply path to a condition that allows for migration of urea water. The invention thus aims to adequately control the respective valve-opening times of the two supply valves during operation of the pump, in order to eliminate a failure in supply of urea water due to the difference between the capacities of the supply paths connecting with the respective supply valves.

According to one aspect of the invention, in an exhaust emission control device that is provided in an exhaust passage of an internal combustion engine and has a first NOx catalyst and a second NOx catalyst configured to reduce NOx by using ammonia as a reducing agent, there is provided a urea water supply system that supplies urea water to the exhaust passage. The urea water supply system may comprise a first supply valve that is located in upstream of the first NOx catalyst and is configured to supply urea water to an exhaust emission flowing into the first NOx catalyst; a second supply valve that is located in upstream of the second NOx catalyst and is configured to supply the urea water to the exhaust emission flowing into the second NOx catalyst; a urea water tank that is configured to store the urea water; a urea water supply path that is arranged to connect the urea water tank with each of the first supply valve and the second supply valve and includes a first supply path which only the urea water to be supplied to the first supply valve flows through and a second supply path which only the urea water to be supplied to the second supply valve flows through, wherein the second supply path has a larger capacity than capacity of the first supply path by a predetermined volume; a pump that is configured to pressure-feed the urea water in the urea water supply path; an acquirer that is configured to obtain a pressure value in the urea water supply path or in the pump or a pressure variation per unit time in the urea water supply path or in the pump; and a controller that is configured to perform filling control of the urea water into the first and second supply valves and into the urea water supply path by operating the pump in a specified operating state and performing open-close control of the first supply valve and the second supply valve. In the filling control, the controller may pressure-feed the urea water to the first supply valve and the first supply path by the pump operated in the specified operating state in a state that at least the first supply valve out of the first and second supply valves is opened, and may close the first supply valve based on the pressure value or the pressure variation per unit time obtained by the acquirer.

The exhaust emission control device has the two NOx catalysts, i.e., the first NOx catalyst and the second NOx catalyst as described above. The urea water supply system of the invention is provided with the first supply valve for supply of urea water corresponding to the first NOx catalyst and the second supply valve for supply of urea water corresponding to the second NOx catalyst. Each of the supply valves may have any configuration that enables urea water to be supplied suitably for the corresponding NOx catalysts. Accordingly, in a range that ensures suitable supply of urea water, the respective supply valves may have an identical specification with regard to supply of urea water or may have different specifications.

In the above urea water supply system, the urea water is pressure-fed by one pump to be filled into the first supply valve and the second supply valve. In other words, the urea water supply system employs the configuration of pump share-type urea water supply. Migration of urea water from the urea water tank to each of the supply valves is through the urea water supply path. The urea water supply path is configured to enable the urea water to be flowed between the urea water tank and each of the supply valves by pressure-feeding of the pump and includes the first supply path which only the urea water to be supplied to the first supply valve flows through and the second supply path which only the urea water to be supplied to the second supply valve flows through. Accordingly, when the urea water supply path includes an additional supply path other than the first supply path and the second supply path, both the urea water to be supplied to the first supply valve and the urea water to be supplied to the second supply valve flows through this additional supply path. In other words, this additional supply path is shared by the two supply valves.

In the urea supply system of this configuration, the controller performs the filling control of urea water into the respective supply valves. More specifically, the controller operates the pump in the specified operating state and subsequently performs open-close control of the first supply valve and the second supply valve. The specified operating state denotes an operating state that enables the pressure-feed capacity of the pump for filling urea water and may be any operating state that allows for filling of urea water. For example, an operating unit in the pump is rotated in a predetermined rotating direction to feed urea water to the supply valve side, while being rotated in a reverse direction to suck back urea water from the supply valve side.

After the controller operates the pump in the specified operating state, opening the first supply valve allows for migration of urea water in the first supply valve and in the first supply path, while opening the second supply valve allows for migration of urea water in the second supply valve and in the second supply path. Opening both the first supply valve and the second supply valve allows for migration of urea water in the respective supply valves and in the respective supply paths. The pump is operated to move the urea water by its pressure-feed capacity. During filling control of opening both the supply valves to move the urea water from the urea water tank into both the supply valves and the supply paths, filling the urea water on the basis of the first supply path having the smaller capacity may result in insufficient filling of urea water into the second supply path. Filling the urea water on the basis of the capacity of the second supply path, on the other hand, may cause urea water to be leaked from the first supply valve connecting with the first supply path having the smaller capacity.

In the urea water supply system of the invention, by taking into account that the capacity of the first supply path is smaller than the capacity of the second supply path by the predetermined volume, the controller controls open/close of the first supply valve at least in the case of filling urea water into the first supply valve and the first supply path, based on the pressure value or the pressure variation per unit time obtained by the acquirer. In the filling control, the controller opens at least the first supply valve to fill urea water. More specifically, the controller may open only the first supply valve or may open both the first supply valve and the second supply valve.

In the former case, opening the first supply valve causes urea water to be filled into the first supply valve and the relevant first supply path. On completion of filling of urea water into the first supply path, the supply path connecting the first supply valve with the pump is filled with urea water. This provides a change of the pressure value or the like obtained by the acquirer, in response to completion of filling urea water into the first supply path. In the latter case, opening both the supply valves causes urea water to be filled into both the first supply valve and the relevant first supply path and the second supply valve and the relevant second supply path. The capacity of the first supply path is smaller than the capacity of the second supply path, so that filling urea water is completed at the earlier timing for the first supply path. At this moment, the supply path connecting the first supply valve with the pump is filled with urea water. This provides a change of the pressure value or the like obtained by the acquirer, in response to completion of filling urea water into the first supply path. This adequately determines the timing of completion of filling urea water in the first supply valve and the first supply path, based on the pressure value or the like obtained by the acquirer, and thereby enables just the enough amount of urea water to be filled. In the filling control of the latter case, the valve-opening timings of the first supply valve and the second supply valve to start filling may be determined based on the difference between the capacities of the first supply path and the second supply path (predetermined volume), such that the first supply path is filled with urea water first. It is, however, preferable to open the first supply path and the second supply path simultaneously.

In the filling control, the controller may pressure-feed the urea water to the second supply valve and the second supply path by means of the pump operated in the specified operating state in the state that the second supply valve is opened, and may close the second supply valve based on the pressure value or the pressure variation per unit time obtained by the acquirer. This adequately determines the timing of completion of filling urea water in the second supply valve and the second supply path and enables just the enough amount of urea water to be filled.

In the urea water supply system of the above aspect, the controller may close the first supply valve, when the pressure value or the pressure variation per unit time obtained by the acquirer during pressure-feeding of the urea water by the pump operated in the specified operating state in the state that at least the first supply valve is opened is increased from a previously obtained pressure value or pressure variation per unit time. This notes an increase in pressure value or an increase in pressure variation per unit time, as the change in pressure value or the like in response to completion of filling urea water in the first supply path described above. In general, pressure-feeding by the pump causes a certain degree of pressure pulsation. In order to adequately detect an increase of the pressure value or the like for the purpose of determining completion of filling, it is preferable to set a threshold value exceeding the pressure pulsation by the pump. In this application, completion of filling urea water is determined when the detected pressure value or the like has an increase beyond the threshold value.

The urea water supply system of the above aspect may further comprise a determiner that is configured to perform a determination process of determining whether either of the first supply valve and the first supply path is clogged, based on a pressure in the urea water supply path or in the pump during the filling control. In this aspect, when the determiner determines that the first supply valve or the first supply path is clogged after the first supply vale is closed in the filling control, the controller may reopen the first supply valve while operating the pump in the specified operating state.

The urea water is moved through the urea water supply path by the pressure-feed capacity of the pump. Accordingly, when the urea water is smoothly moved through the urea water supply path, a specific pressure condition that allows for migration of urea water is provided. When the first supply valve or the first supply path is clogged, for example, due to soot entering the first supply valve, on the other hand, controlling the valve-closing timing of the first supply valve based on the pressure value or the like obtained by the acquirer described above may fail in providing a target state with regard to urea water (i.e., the state that urea water is filled, hereinafter referred to as "predetermined target state") inside of the first supply valve or inside of the first supply path after the valve-closing. This may result in providing a pressure condition in the urea water supply path or the pump different from an expected pressure condition. The determiner may thus determine whether the first supply valve or the first supply path is clogged, based on the pressure in the urea water supply path or in the pump after the valve-closing of the first supply valve.

When the determiner determines that the first supply valve or the first supply path is clogged, it is expected that the filling control does not cause inside of the first supply valve and inside of the first supply path to reach the predetermined target state as described above. In this case, reopening the first supply valve with operating the pump in the specified operating state definitely causes the state inside of the first supply valve and inside of the first supply path to reach the predetermined target state and thereby suppresses the occurrence of a failure in supply of urea water.

A configuration described below may be employed with respect to the determination process performed in the urea water supply system of the above aspect with the determiner. In the urea water supply system of the above aspect, in the filling control, the controller may pressure-feed the urea water to the first supply valve, the first supply path, the second supply valve and the second supply path by the pump operated in the specified operating state in a state that both the first supply valve and the second supply valve are opened, and may close the first supply valve based on the pressure value or the pressure variation per unit time obtained by the acquirer. In this configuration, the determiner may determine that the first supply valve or the first supply path is clogged when a pressure condition of urea water induced by valve-closing of the first supply valve continues for a predetermined time after valve-closing of the first supply valve. When the determiner determines that the first supply valve or the first supply path is clogged, the controller may close the second supply valve and reopen the first supply valve while operating the pump in the specified operating state.

This configuration starts filling urea water simultaneously into the first supply valve and the second supply valve. When the first supply valve or the first supply path is clogged, urea water is unlikely to be filled into the first supply valve side. This causes a larger amount of urea water than expected to be filled into the second supply valve side and results in filling the second supply valve and the second supply path of the relatively larger capacity prior to the first supply valve and the first supply path. The controller closes the first supply valve, based on a change of the pressure value or the like due to filling of the second supply valve and the like. In spite of this, there is a high possibility that filling of urea water is not completed in the first supply valve and the first supply path. The second supply valve and the second supply path have already been filled, while the first supply valve or the first supply path is clogged. This results in maintaining the pressure condition induced by the change of the pressure value or the like. The determiner may thus determine that the first supply valve or the first supply path is clogged, when the pressure condition continues for the predetermined time.

While the above pressure condition continues, the second supply valve is kept open, so that urea water is leaked from the second supply valve. It is accordingly preferable to set a time as short as possible to the predetermined time to accurately determine clogging of the first supply valve or the like while reducing the amount of leakage of urea water as much as possible. When the determiner determines that the first supply valve or the like is clogged, the controller closes the second supply valve to suppress leakage of urea water, and reopens the first supply valve to restart filling urea water into the first supply valve and the first supply path.

In the urea water supply system of any of the above aspects with the determiner, the first NOx catalyst and the second NOx catalyst may be arranged in series along a flow of the exhaust emission in the exhaust passage of the internal combustion engine, and the first NOx catalyst may be placed in upstream of the second NOx catalyst. In the exhaust emission control device having such configuration of the NOx catalysts, the first supply valve corresponding to the first NOx catalyst located on the upstream side is placed nearer to the internal combustion engine than the second supply valve. The first supply valve is accordingly exposed to the environment that makes soot in the exhaust emission more likely to enter the supply valve through its opening. The determination process by the determiner described above is thus especially advantageous in this configuration. This is, however, not intended to interfere with employing any other configuration of NOx catalysts in the urea water supply system of the invention. For example, the configuration with regard to the determiner described above may be applied to a configuration that the first NOx catalyst and the second NOx catalyst are arranged in parallel in the exhaust passage of the internal combustion engine. In this latter configuration, the amount of soot included in the exhaust emission flowing into the first NOx catalyst may not be necessarily greater than the amount of soot included in the exhaust emission flowing into the second NOx catalyst.

The above aspects of the invention suppress the occurrence of a failure in supply of urea water as much as possible in filling control of urea water in two supply paths in a pump share-type urea water supply system with two supply valves and two supply paths connecting with the respective supply valves.

DESCRIPTION OF EMBODIMENTS

The following describes some concrete embodiments of the invention with reference to the drawings. The dimensions, the materials, the shapes, the positional relationships and the like of the respective components described in the following embodiments are only for the purpose of illustration and not intended at all to limit the scope of the invention to such specific descriptions.

First Embodiment

Figure 1:
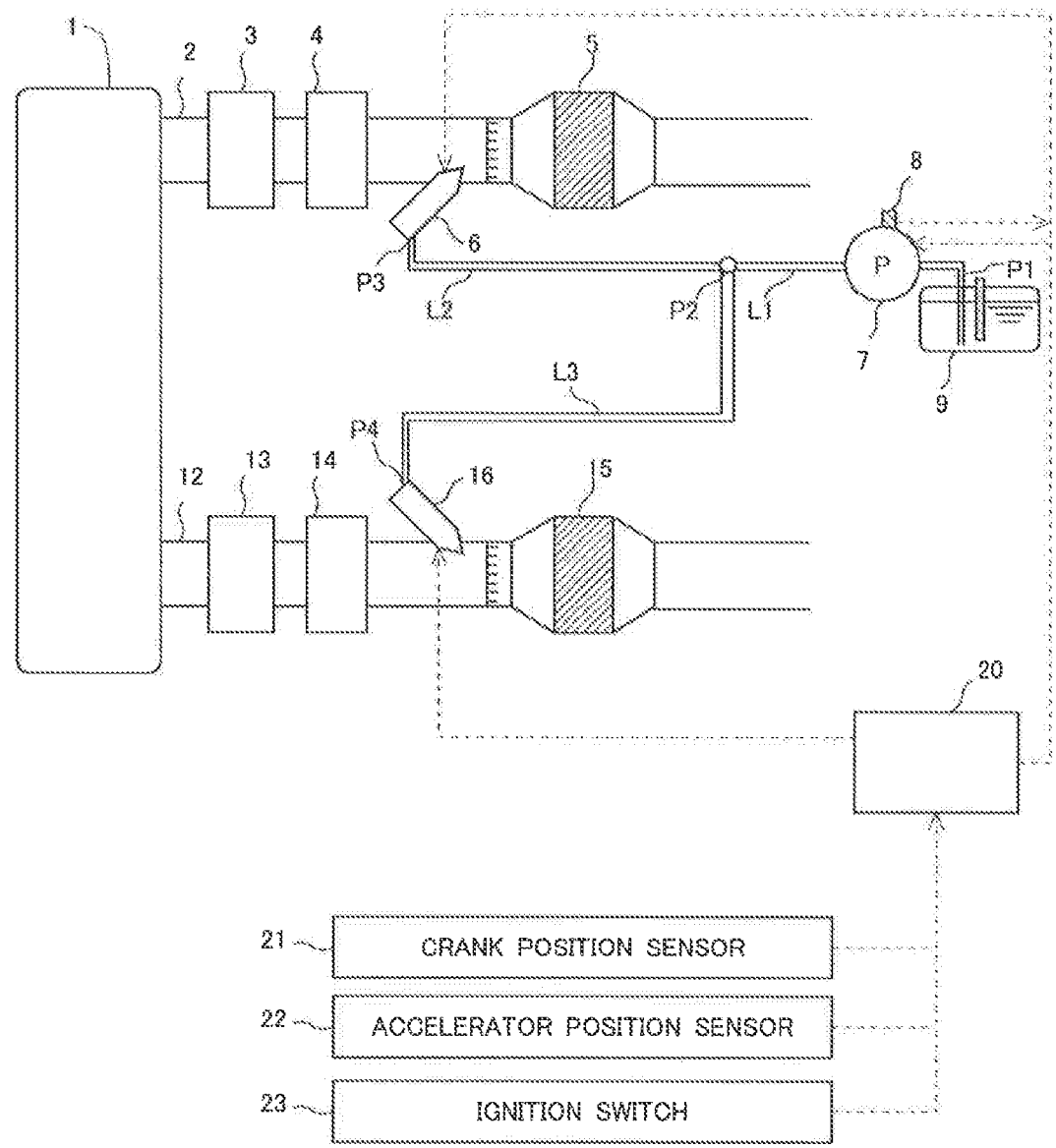
FIG. 1 is a first diagram schematically illustrating a configuration of a urea water supply system for an exhaust emission control device of an internal combustion engine according to the invention.
Figure 2:
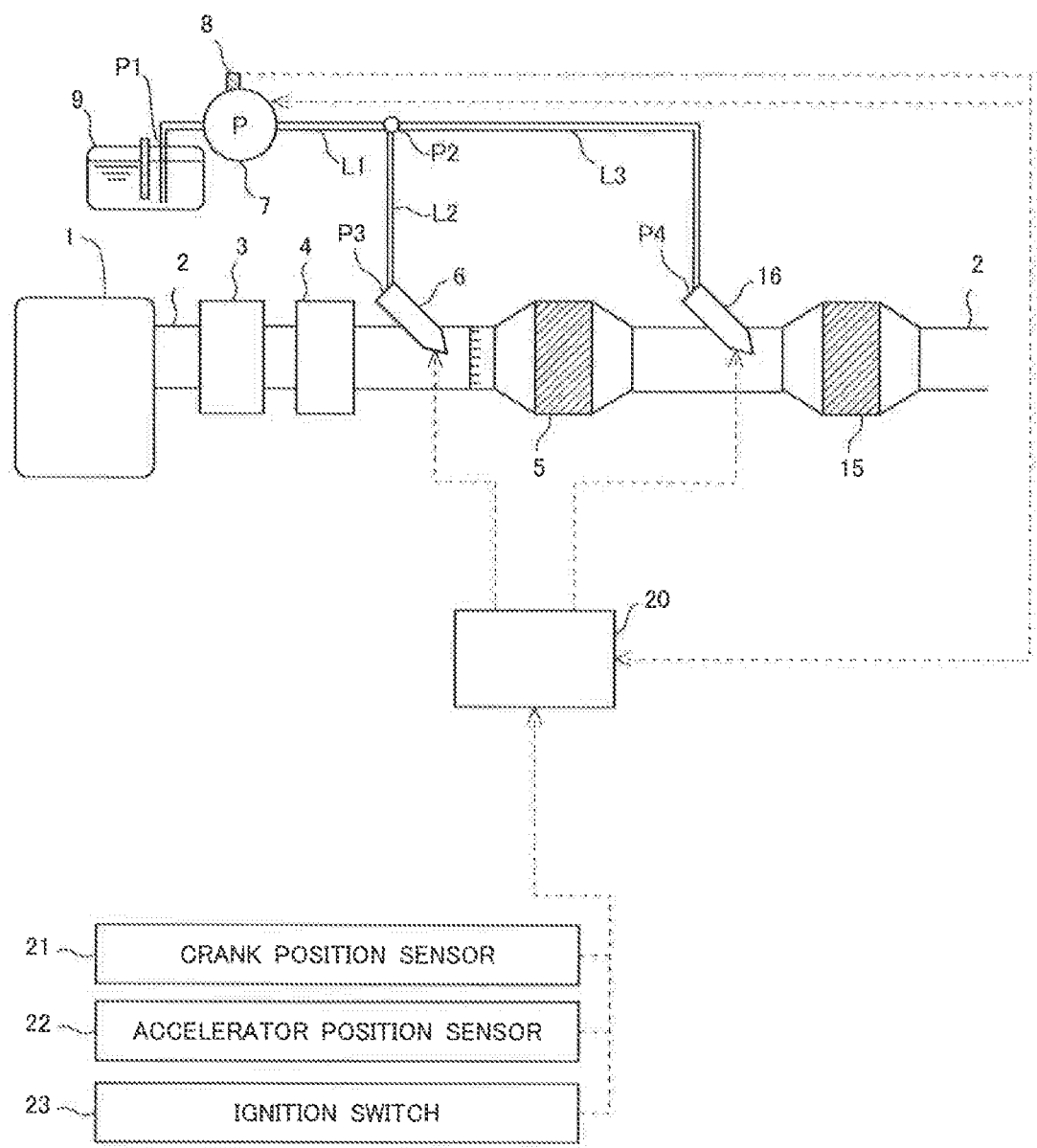
FIG. 2 is a second diagram schematically illustrating another configuration of the urea water supply system for the exhaust emission control device of the internal combustion engine according to the invention.

The following describes the schematic configurations of a urea water supply system (hereinafter may simply be referred to as "system") and an exhaust emission control device of an internal combustion engine which the system is applied to, with reference to FIGS. 1 and 2. An internal combustion engine 1 shown in FIG. 1 is a diesel engine for driving a vehicle. The internal combustion engine of the invention is, however, not limited to the diesel engine but may be a gasoline engine or the like. The urea water supply system of the invention is configured to supply urea water to supply valves that are arranged to supply ammonium as a reducing agent to two NOx catalysts provided in an exhaust passage of the internal combustion engine 1. Exhaust emission control devices of FIGS. 1 and 2 are illustrated as examples of the exhaust emission control device of the internal combustion engine which the system is applied to and are not at all intended to limit the application of the invention to both or either of the exhaust emission control devices.

<First Configuration>

The following describes a first configuration of the urea water supply system of the invention and the exhaust emission control device of the internal combustion engine 1 which the urea water supply system is applied to, with reference to FIG. 1. The internal combustion engine 1 is a V engine and has two connected exhaust passages 2 and 12 corresponding to respective banks of the V engine. The respective exhaust passages 2 and 12 basically have similar schematic configurations. A first NOx catalyst 5 is placed in the exhaust passage 2 to selectively reduce NOx in exhaust emission using ammonia as the reducing agent. In order to produce ammonia that works as the reducing agent in the first NOx catalyst 5, urea water as a precursor of ammonia is stored in a urea water tank 9 and is supplied to the exhaust emission by means of a first supply valve 6 that is located in the upstream of the first NOx catalyst 5. The urea water supplied by the first supply valve 6 is hydrolyzed with heat of exhaust emission to produce ammonia. The ammonia then flows into and is adsorbed to the first NOx catalyst 5, so that NOx in the exhaust emission is removed through reduction reaction of ammonia with NOx. An oxidation catalyst for oxidizing ammonia slipped from the first NOx catalyst 5 (hereinafter referred to as "ASC catalyst") is provided in the downstream of the first NOx catalyst 5, although not being illustrated in FIG. 1.

Additionally, an oxidation catalyst 3 having oxidation function and a filter 4 for trapping particulate substances in the exhaust emission are provided in the upstream of the first NOx catalyst 5 and the first supply valve 6. The oxidation catalyst 3 serves to oxidize a fuel component included in the exhaust emission, raise the temperature of the exhaust emission and flows out the heated exhaust emission to the filter 4, so that the particulate substances trapped by the filter 4 are oxidized and removed. The temperature rise of the exhaust emission by the oxidation catalyst 3 is achieved by adequately controlling the combustion conditions in the internal combustion engine 1 to regulate the fuel component (uncombusted component) in the exhaust emission and accelerate oxidation of the fuel component by the oxidation catalyst 3. Alternatively, a fuel supply valve may be provided in the upstream of the oxidation catalyst 3 to supply the fuel of the internal combustion engine 1 to the oxidation catalyst 3 via the exhaust emission.

A second NOx catalyst 15 and a second supply valve 16 for supply urea water corresponding to the NOx catalyst are also provided in the exhaust passage 12 provided in parallel to the exhaust passage 2. Additionally, an oxidation catalyst 13 having oxidation function and a filter 14 for trapping particulate substances in the exhaust emission are provided in the upstream of the second NOx catalyst 15 and the second supply valve 16.

The following describes a configuration of supplying urea water from the urea water tank 9 to the first supply valve 6 and the second supply valve 16. The urea water tank 9 is connected with the first supply valve 6 by a supply path L1 (supply path division from a point P1 on the urea water tank 9-side to a branch point P2) and a supply path L2 (supply path division from the branch point P2 to a first supply valve P3) that are arranged to supply the urea water. The urea water tank 9 is, on the other hand, connected with the second supply valve 16 by the supply path L1 and a supply path L3 (supply path division from the branch point P2 to a second supply valve P4) that are arranged to supply the rear water. Accordingly, the supply path L1 is shared by the supply paths formed between the urea water tank 9 and the first supply valve 6 and between the urea water tank 9 and the second supply valve 16, and only the flow of urea water to be supplied to each of the supply valves is pressure-fed through the supply path from the branch point P2 to each supply valve. A pump 7 for pressure-feeding the urea water in the supply paths L1 to L3 is provided in the common supply path L1. Normal rotation of the pump 7 causes the urea water to be pressure fed from the urea water tank 9 to each supply valve, and reverse rotation of the pump 7 causes the urea water to be pressure fed from each supply valve to the urea water tank 9.

The exhaust passages 2 and 12, the urea water tank and the supply paths of urea water are placed along the vehicle body frame. In this embodiment, the urea water tank 9 is placed at the position nearer to the exhaust passage 2. With regard to the supply paths of urea water, the overall length of the supply path L2 for the flow of urea water including the first supply valve 6 is thus shorter than the overall length of the supply path L3 for the flow of urea water including the second supply valve 16 (i.e., L2<L3). In this embodiment, the supply paths L1, L2 and L3 have an identical sectional area. The different lengths of the supply paths L2 and L3 accordingly causes the capacity of the supply path L3 to be greater than the capacity of the supply path L2 by a specified volume $\Delta V$.

A pressure sensor 8 is mounted to the pump 8 to detect the internal pressure of the supply path L1 for the urea water. The internal combustion engine 1 is provided with an electronic control unit (ECU) 20 that controls the operating conditions of the internal combustion engine 1 and the exhaust emission control device. The ECU 20 is electrically connected with a crank positions sensor 21 and an accelerator position sensor 22 in addition to the above pressure sensor 8 to receive detection values sent from the respective sensors. The ECU 20 accordingly obtains the operating conditions of the internal combustion engine 1, such as the detected internal pressure of the supply path L1, the engine rotation speed based on the detection of the crank position sensor 21 and the engine load based on the detection of the accelerator position sensor 22. The internal pressure of the supply path L1 may alternatively be estimated from, for example, the relationship between the driving power and the rotation speed of the pump 7. For example, in the pump 7, based on the phenomenon that an increase in pressure of urea water reduces the increase rate of rotation speed relative to driving power, the pressure of urea water may be estimated by using the relationship between the driving power and the rotation speed. This modified configuration allows for omission of the pressure sensor 8. Additionally, the ECU 20 is electrically connected with an ignition switch 23 to receive an ignition ON/OFF signal of the internal combustion engine 1. The pump 7, the first supply valve 6 and the second supply valve 16 are also electrically connected with the ECU 20 and are driven in response to control signals from the ECU 20.

<Second Configuration>

The following describes a second configuration of the urea water supply system of the invention and the exhaust emission control device of the internal combustion engine 1 which the urea water supply system is applied to, with reference to FIG. 2. The like components of the urea supply system and the exhaust emission control device of the second configuration that are substantially similar to the components of the first configuration are expressed by the like signs and are not specifically described here.

The internal combustion engine 1 of this configuration has one exhaust passage 2. Two NOx catalysts are arranged in series in the exhaust passage 2. More specifically, a first NOx catalyst 5 is arranged in the upstream along the flow of the exhaust emission, and a second NOx catalyst 15 is arranged in the downstream. In order to produce ammonia that works as the reducing agent in the first NOx catalyst 5, urea water stored in a urea water tank 9 is supplied to the exhaust emission by means of a first supply valve 6 that is located in the upstream of the first NOx catalyst 5. Similarly, in order to produce ammonia that works as the reducing agent in the second NOx catalyst 15, the urea water stored in the urea water tank 9 is supplied to the exhaust emission by means of a second supply valve 16 that is located in the upstream of the second NOx catalyst 15 but in the downstream of the first NOx catalyst 5. An oxidation catalyst 3 having oxidation function and a filter 4 for trapping particulate substances in the exhaust emission are provided in the upstream of the first NOx catalyst 5 and the first supply valve 6.

The following describes a configuration of supplying urea water from the urea water tank 9 to the first supply valve 6 and the second supply valve 16 in the urea water supply system applied to the exhaust emission control device described above. Like the first configuration, in the second configuration, the urea water tank 9 is connected with the first supply valve 6 by a supply path L1 (supply path division from a point P1 on the urea water tank 9-side to a branch point P2) and a supply path L2 (supply path division from the branch point P2 to a first supply valve P3) that are arranged to supply the urea water. The urea water tank 9 is, on the other hand, connected with the second supply valve 16 by the supply path L1 and a supply path L3 (supply path division from the branch point P2 to a second supply valve P4) that are arranged to supply the rear water. Accordingly, the supply path L1 is shared by the supply paths formed between the urea water tank 9 and the first supply valve 6 and between the urea water tank 9 and the second supply valve 16, and only the flow of urea water to be supplied to each of the supply valves is pressure-fed through the supply path from the branch point P2 to each supply valve.

In this embodiment, the urea water tank 9 is placed at the position nearer to the first supply valve 6 than the second supply valve 16. With regard to the supply paths of urea water, the overall length of the supply path L2 for the flow of urea water including the first supply valve 6 is thus shorter than the overall length of the supply path L3 for the flow of urea water including the second supply valve 16. Like the first configuration, this results in making the capacity of the supply path L3 greater than the capacity of the supply path L2 by a specified volume $\Delta V$.

<Control with Regard to Supply of Urea Water>

In the first and the second configurations described above, the urea water is pressure-fed from the urea water tank 9 to each supply valve and is supplied to the exhaust emission, in order to reduce NOx included in the discharged exhaust emission during operation of the internal combustion engine 1. When the urea water remains in any of the supply valves and the supply paths in the state that the internal combustion engine 1 is stopped or at a stop, ammonia is likely to be produced from the remaining urea water due to, for example, external heat and cause corrosion of the supply valve or the supply path. The urea water supply system of the invention performs control with regard to supply of urea water, in order to prevent the urea water from remaining in any of the supply valves and the supply paths when there is no requirement for using the urea water in the exhaust emission control device of the internal combustion engine 1.

More specifically, the urea water supply system of the invention performs suck-back control to return the urea water remaining in any of the supply valves and the supply paths to the urea water tank 9 at a stop of the internal combustion engine 1 and filling control to fill urea water into the vacant supply valves and supply paths to allow for supply of urea water to the exhaust emission at a start of the internal combustion engine 1, as the control with regard to supply of urea water. The following describes the details of filling control to fill urea water into the first supply valve 6, the second supply valve 16 and the relevant supply paths, in which no urea water substantially remains by the previous suck-back control. The description is on the assumption that the filling control is performed in the the urea water supply system and the exhaust emission control device of the first configuration shown in FIG. 1 as a typical example. This is, however, only for the purpose of illustration and is not intended at all to limit the conditions of the control to this configuration.

<Filling Control>

Figure 3:
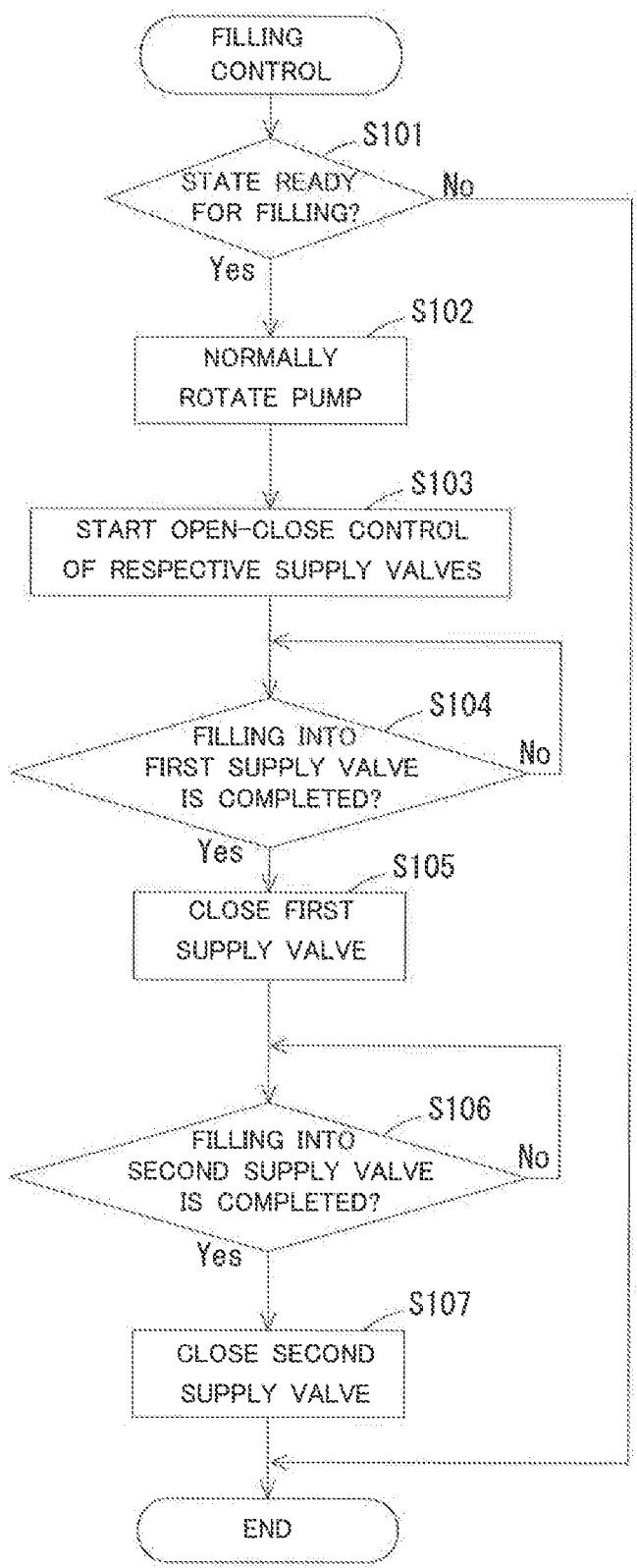
FIG. 3 is a flowchart showing a first flow of filling control of urea water performed in the urea water supply system shown in FIG. 1 or FIG. 2.

A control flow of filling control performed in the urea water supply system of the invention is described with reference to FIG. 3. FIG. 3 is a flowchart of filling control performed by the ECU 20. The filling control is repeatedly performed at predetermined time intervals by the ECU 20 during operation of the internal combustion engine 1. The ECU 20 executes a predetermined control program to perform the control shown in the flowchart of FIG. 3.

At S101, the flow determines whether the current state is the state that is ready for supply of urea water from the urea water tank 9 to the respective supply valves 6 and 16. More specifically, when the internal combustion engine 1 is started and warm-up of both the NOx catalysts is completed, a filling ready flag for the filling control is changed from OFF to ON. An affirmative answer is given at S101 in response to the ON setting of the filling ready flag, and a negative answer is given at S101 in response to the OFF setting of the filling ready flag. In response to the affirmative answer at S101, the flow proceeds to S102. In response to the negative answer at S101, the flow terminates this control. Prior to a start of the internal combustion engine 1, no urea water substantially remains in the respective supply valves and the respective supply paths as described above.

At S102, the flow normally rotates the pump 7. This applies a pressure to feed urea water from the urea water tank 9 to the supply paths L1 to L3 and the respective supply valves 6 and 16. The normally rotating state of the pump 7 corresponds to the specified operating state for filling of the claims. On completion of the processing of S102, the flow proceeds to S103.

At S103, the flow starts open-close control of the respective supply valves 6 and 16, while the pump 7 is maintained in the normally rotating state. The details of open-close control will be described later. On completion of the processing of S103, the flow proceeds to S104. At S104, the flow determines whether filling of urea water into the first supply valve 6 is completed. More specifically, the determination process of S104 determines an estimated time when filling of urea water into the first supply valve 6 is expected to be completed, based on a variation in internal pressure of the supply path L1 as described later. In response to an affirmative answer at S104, the flow proceeds to S105. In response to a negative answer at S104, the flow repeats the processing of S104. At S105, the flow closes the first supply valve 6.

Subsequently the flow proceeds to S106 to determine whether filling of urea water into the second supply valve 16 is completed. More specifically, the determination process of S106 determines an estimated time when filling of urea water into the second supply valve 16 is expected to be completed, based on a variation in internal pressure of the supply path L1 as described later. In response to an affirmative answer at S106, the flow closes the second supply valve 16 at S107 and then terminates this control. In response to a negative answer at S106, the flow repeats the processing of S106.

Figure 4:
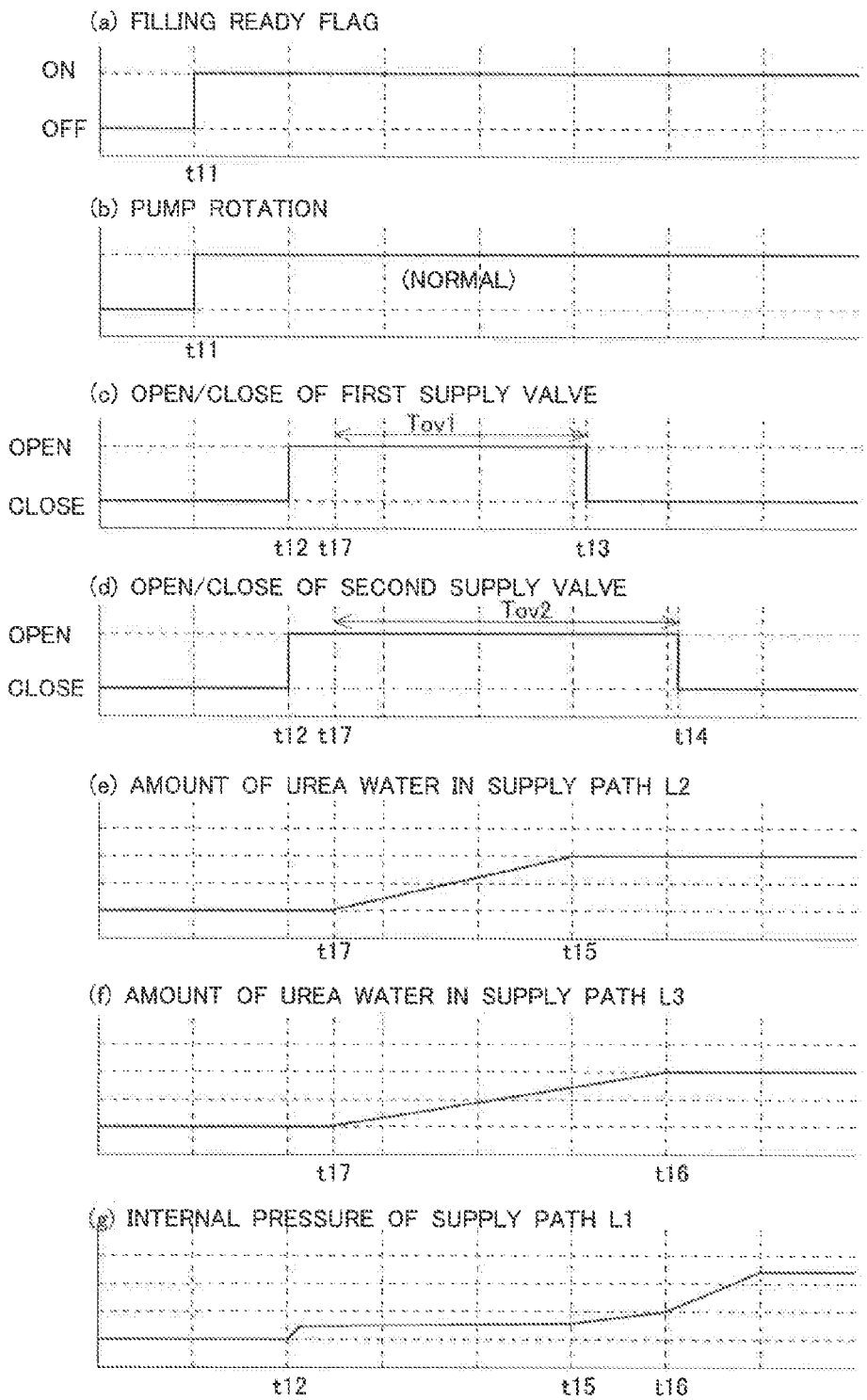
FIG. 4 is a first time chart showing variations of control elements such as supply valves in the course of the filling control of FIG. 3.
Figure 5:
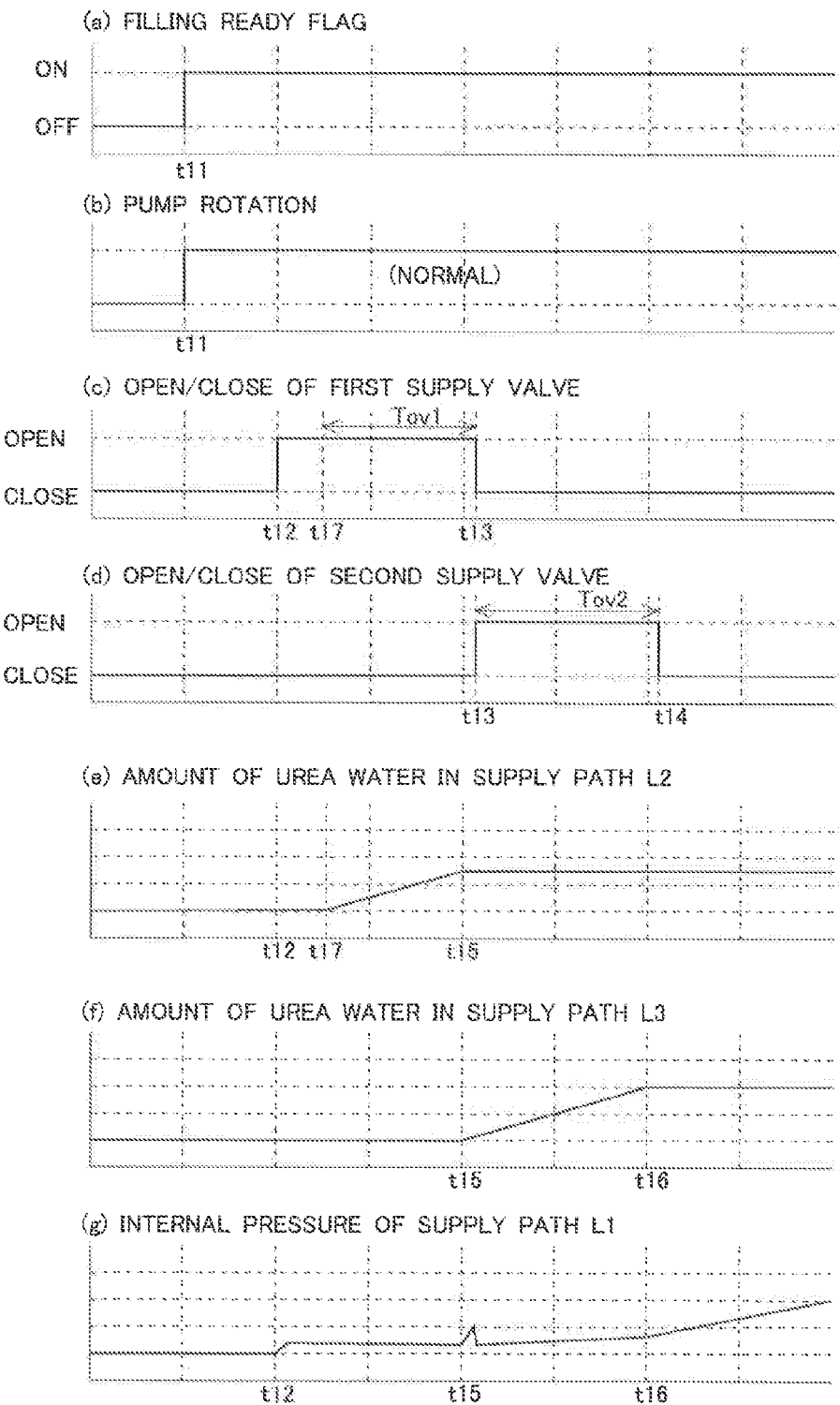
FIG. 5 is a second time chart showing variations of the control elements such as the supply valves in the course of the filling control of FIG. 3.

The following describes the open-close control of the respective supply valves for filling urea water performed in the filling control of FIG. 3, with reference to FIGS. 4 and 5. FIGS. 4 and 5 are time charts showing (a) variation in setting of the filling ready flag, (b) variation in pump rotation signal, (c) variation in open-close signal of the first supply valve 6, (d) variation in open-close signal of the second supply valve 16, (e) variation in amount of urea water in the supply path L2, (0 variation in amount of urea water in the supply path L3 and (g) variation in internal pressure of the supply path L1 with respect to the open-close control of the respective supply valves in various different filling patterns. The internal pressure of the supply path L1 denotes the pressure detected by the pressure sensor 8. The following describes the open-close control of the respective supply valves in the respective patterns of FIGS. 4 and 5.

(1) First Pattern

The following describes a first pattern of the open-close control of the respective supply valves for filling with reference to FIG. 4. The filling ready flag is set ON at a time t11 as shown in FIG. 4(*a*), and the pump 7 is normally rotated at the time t11 as shown in FIG. 4(*b*) (processing of S102). The pump 7 has the constant rotation speed and maintains the substantially constant pressure-feed capacity as described above. In the first pattern, as shown in FIGS. 4(*c*) and 4(*d*), the first supply valve 6 and the second supply valve 16 are simultaneously opened at a time t12, so that filling of urea water from the urea water tank 9 into the respective supply valves 6 and 16 is started. FIGS. 4(*e*) and 4(*f*) show variations in amount of urea water in the supply paths L2 and L3 by such valve open-close control.

In the first pattern, in an initial stage of filling (time period from time t12 to time 17), urea water is first filled into the supply path L1 and is subsequently filled into the supply paths L2 and L3 and the respective supply valves 6 and 16. In the first pattern, a time Tov1 after the time t17 corresponds to the valve-opening time of the first supply valve 6 to fill the supply path L2, and a time Tov2 after the time t17 corresponds to the valve-opening time of the second supply valve 16 to fill the supply path L3. The time period from the time t12 to the time t17 may be given as V2/α, where V2 represents the capacity of the supply path L1 and a represents the pressure-feed capacity of the pump 7.

In the first pattern, completion of filling of urea water into each of the supply valves is determined, based on a variation in internal pressure of the supply path L1. As described above, simultaneously opening both the supply valves 6 and 16 at the time t12 fills urea water into the supply paths L2 and L3. The capacity of the supply path L2 is smaller than the capacity of the supply path L3 by a predetermined volume ΔV, so that filling of urea water into the supply path L2 and the first supply valve 6 is expected to be completed at an earlier timing than filling of urea water into the supply path L3 and the second supply valve 16. At the time when filling of urea water into the supply path L2 and the first supply valve 6 is completed (at a time t15 shown in FIG. 4(e)), the resistance with regard to migration of urea water on the first supply valve 6-side increases to increase the pressure applied to the urea water in the course of filling. According to this embodiment, completion of filling of urea water into the first supply valve 6 is detected at the time when a time rate of change (rise rate) in internal pressure of the supply path L1 is significantly increased from the previous time rate of change of the pressure as shown in FIG. 4(g). Based on this detection result, the first supply valve 6 is closed at a time t13 slightly delayed from the time t15 (processing of S105). The valve-closing time t13 is slightly delayed from the filling completion time t15, since a certain delay time is required between completion of filling of urea water into the supply path L2 and the first supply valve 6 and reflection of the completion of filling on the pressure of urea water to be detectable by the pressure sensor 8.

When the first supply valve 6 is closed on completion of filling, urea water from the urea water tank 9 is only filled into the second supply valve 16. As in the case of the first supply valve 6, at a time when filling of urea water into the second supply valve 16 is expected to be completed (at a time t16 shown in FIG. 4(f), a time rate of change (rise rate) in internal pressure of the supply path L1 is significantly increased from the previous time rate of change of the pressure in the time period from the time t15 to the time t16 as shown in FIG. 4(g). At this time, filling of urea water into the second supply valve 16 is detected. Based on this detection result, the second supply valve 16 is closed at a time t14 slightly delayed from the time t16 (processing of S107). The valve-closing time t14 is slightly delayed from the filling completion time t16, because of the same reason as that described above with regard to the first supply valve 6.

Such open-close control of the respective supply valves 6 and 16 enables just enough amounts of urea water to be filled into the first supply valve 6 and the second supply valve 16. A difference between the valve-opening time Tov1 of the first supply valve 6 and the valve-opening time Tov2 of the second supply valve 16 for filling urea water reflects the predetermined volume ΔV that is the difference between the capacities of the supply paths L2 and L3. Accordingly, the valve-opening time Tov1 of the first supply valve 6 is shorter than the valve-opening time Tov2 of the second supply valve 16 by a time required for filling urea water into the predetermined volume ΔV of the supply path L3. In the urea water supply system of the invention, the valve-closing timings of the first supply valve 6 and the second supply valve 16 are determined based on the pressure value detected by the pressure sensor 8 and its time rate of change, so as to ensure efficient filling of urea water.

(2) Second Pattern

The following describes a second pattern of the open-close control of the respective supply valves for filling with reference to FIG. 5. The filling ready flag is set ON at a time t11 as shown in FIG. 5(a), and the pump 7 is normally rotated at the time t11 as shown in FIG. 5(b) (processing of S102). The pump 7 has the constant rotation speed and maintains the substantially constant pressure-feed capacity as described above. The open-close control of the respective supply valves is started at a time t12. In the second pattern, as shown in FIGS. 5(c) and 5(d), at the time t12, only the first supply valve 6 is opened, so that filling of urea water into the first supply valve 6 is performed. At this moment, however, the second supply valve 16 is kept closed, and filling of urea water into the second supply valve 16 is not performed. On completion of filling of urea water into the first supply valve 6, only the second supply valve 16 is opened, so that filling of urea water into the second supply valve 16 is performed. FIGS. 5(e) and 5(f) show variations in amount of urea water in the supply paths L2 and L3 by such valve open-close control.

In the second pattern, in an initial stage of filling (time period from time t12 to time 17), urea water is first filled into the supply path L1 and is subsequently filled into the supply path L2 and the first supply valve 6. In the second pattern, a time Tov1 after the time t17 corresponds to the valve-opening time of the first supply valve 6 to fill the supply path L2, and a time Tov2 after closing the first supply valve 6 corresponds to the valve-opening time of the second supply valve 16 to fill the supply path L3. The time period from the time t12 to the time t17 may be given as V2/α.

In the second pattern, completion of filling of urea water into each of the supply valves is also determined, based on a variation in internal pressure of the supply path L1. As described above, opening only the first supply valve 6 at the time t12 causes urea water to be filled into the supply path L2 after the time t17. At the time when filling of urea water into the supply path L2 and the first supply valve 6 is completed (at a time t15 shown in FIG. 5(e)), the second supply valve 16 is still kept closed, so that the internal pressure of the supply path L1 abruptly increases. Completion of filling of urea water into the first supply valve 6 is detected at the time of the abrupt pressure increase. Based on this detection result, the first supply valve 6 is closed at a time t13 slightly delayed from the time t15. The valve-closing time t13 is slightly delayed from the filling completion time t15, since a certain delay time is required to make the pressure increase detectable by the pressure sensor 8.

At the time t13, the first supply valve 6 is closed on completion of filling (processing of S105) and the second supply valve 16 is opened at the same time. This suppresses the increase in internal pressure of the supply path L1. Subsequently urea water is filled through the supply path L3 into the second supply valve 16. At a time when filling of urea water into the second supply valve 16 is expected to be completed (at a time t16 shown in FIG. 5(f)), a time rate of change (rise rate) in internal pressure of the supply path L1 is significantly increased from the previous time rate of change of the pressure in the time period from the time t15 to the time t16 as shown in FIG. 5(g). At this time, filling of urea water into the second supply valve 16 is detected. Based on this detection result, the second supply valve 16 is closed at a time t14 slightly delayed from the time t16 (processing of S107). The valve-closing time t14 is slightly delayed from the filling completion time t16, because of the same reason as that described above with regard to the first supply valve 6.

Such open-close control of the respective supply valves 6 and 16 enables just enough amounts of urea water to be filled into the first supply valve 6 and the second supply valve 16.

A difference between the valve-opening time Tov1 of the first supply valve 6 and the valve-opening time Tov2 of the second supply valve 16 for filling urea water reflects the predetermined volume ΔV that is the difference between the capacities of the supply paths L2 and L3. Accordingly, the valve-opening time Tov1 of the first supply valve 6 is shorter than the valve-opening time Tov2 of the second supply valve 16 by a time required for filling urea water into the predetermined volume ΔV of the supply path L3. In the urea water supply system of the invention, the valve-closing timings of the first supply valve 6 and the second supply valve 16 are determined based on the pressure value detected by the pressure sensor 8 and its time rate of change, so as to ensure efficient filling of urea water.

Second Embodiment

Figure 6:
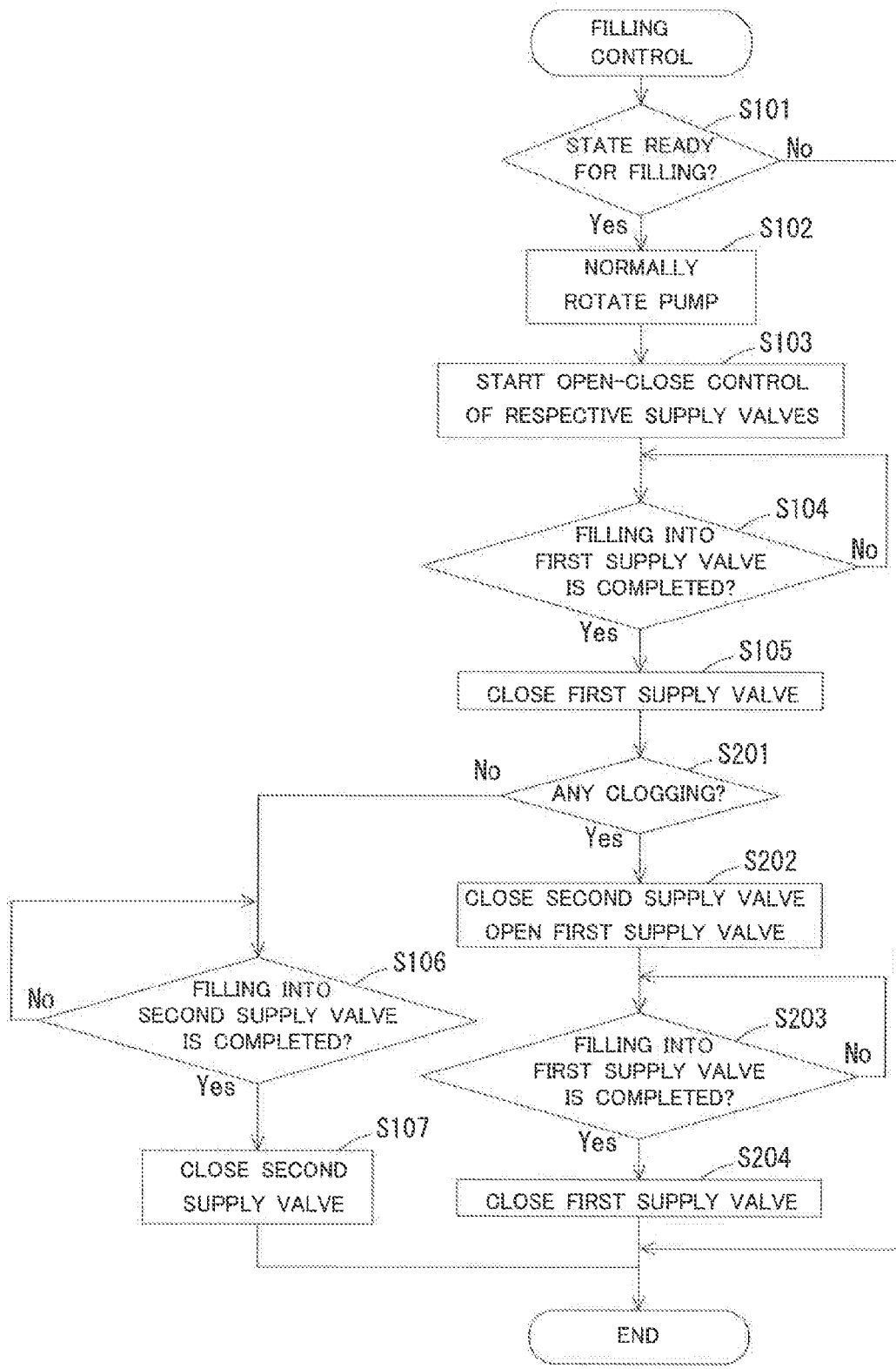
FIG. 6 is a flowchart showing a second flow of filling control of urea water performed in the urea water supply system shown in FIG. 1 or FIG. 2.
Figure 7:
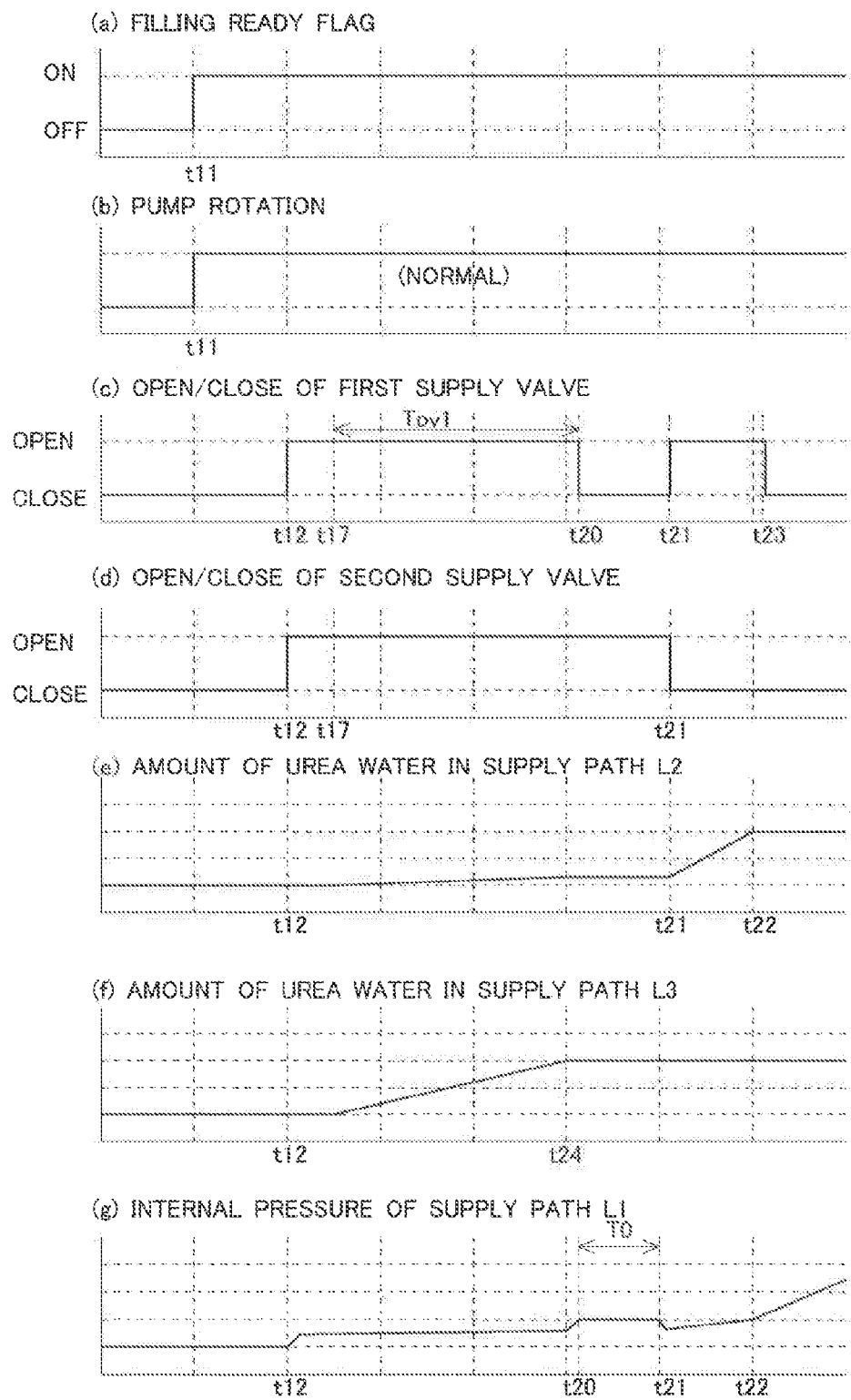
FIG. 7 is a time chart showing variations of the control elements such as the supply valves in the course of the filling control of FIG. 6.

The following describes a second embodiment with regard to open-close control of the respective supply valves in filling control of urea water with reference to FIG. 6. FIG. 7 shows a time chart showing (a) variation in setting of the filling ready flag, (b) variation in pump rotation signal, (c) variation in open-close signal of the first supply valve 6, (d) variation in open-close signal of the second supply valve 16, (e) variation in amount of urea water in the supply path L2, (f) variation in amount of urea water in the supply path L3 and (g) variation in internal pressure of the supply path L1 with respect to the open-close control of the respective supply valves in the filling control shown in FIG. 6. The filling control shown in FIG. 6 is performed by the ECU 20 like the filling control shown in FIG. 3. The like steps in the filling control of FIG. 6 that are substantially similar to the steps in the filling control of FIG. 3 are expressed by the like step numbers and are not specifically described here. In this embodiment, it is assumed that the open-close control in the first pattern described above is performed as the open-close control of the respective supply valves at S103.

In this embodiment, after the processing of S105, the flow performs a clogging detection process with regard to clogging in the first supply valve 6 at S201. According to this embodiment, like the first pattern described above, completion of filling of urea water into each of the supply valves is determined, based on a variation in internal pressure of the supply path L1. More specifically, at a time t20 when the internal pressure of the supply path L1 has an increase after the first supply valve 6 and the second supply valve 16 are opened, the flow determines that filling of urea water into the first supply valve 6 is completed (affirmative answer is given at S104) and closes the first supply valve 6 (processing of S105). As a result, only the second supply valve 16 is kept open. In this embodiment, however, even after elapse of a predetermined time T0 from the time t20, the pressure is maintained at the increased level or more specifically at the increased level based on which it is determined that filling of the first supply valve 6 is completed. This is attributed to the following phenomenon. Even though both the supply valves 6 and 16 are opened at the time t12, clogging of the first supply valve 6 causes filling of urea water to be actually focused on the second supply valve 16-side. As a result, filling of urea water into the supply path L3 and the second supply valve 16 is completed at a time t24 slightly before the time 20 (as shown in FIG. 7(f)).

When the internal pressure of the supply path L1 is maintained at the increased level which is induced by valve-closing of the first supply valve 6 for the predetermined time T0 after the first supply valve 6 is closed upon determination that filling into the first supply valve 6 is completed, the flow determines that the first supply valve 6 is clogged (processing of S201). The predetermined time T0 is preferably set to be as short as possible in such a range that allows for detection of clogging of the first supply valve 6, in order to suppress urea water from leaking from the second supply valve 16 that has already been filled with urea water. At a time t21 after elapse of the predetermined time T0 from the time t20 when clogging is detected at S201, the flow closes the second supply valve 16 in order to suppress urea water from leaking from the second supply valve 16 that has already been filled with urea water, while additionally opening the first supply valve 6 (processing of S202) in order to additionally fill urea water into the first supply valve 6 in the insufficient filling state. In this case, completion of filling into the first supply valve 6 may be determined, based on a variation in internal pressure of the supply path L1 at a time t22 when urea water is actually filled into the supply path L2 and reaches the first supply valve 6 (processing of S203). The flow then closes the first supply valve 6 (processing of S204) at a time t23 slightly delayed from the time t22 when an affirmative answer is given at S203. If the flow determines that the first supply valve 6 is not clogged at S201 (negative answer is given at S201), the flow proceeds to S106 and S107.

Such open-close control of the respective supply valves 6 and 16 enables urea water to be efficiently filled into the respective supply valves 6 and 16 even when the first supply valve 6 is clogged.

The invention claimed is:

1. In an exhaust emission control device that is provided in an exhaust passage of an internal combustion engine and has a first NOx catalyst and a second NOx catalyst configured to reduce NOx by using ammonia as a reducing agent, a urea water supply system that supplies urea water to the exhaust passage, the urea water supply system comprising:
    a first supply valve that is located upstream of the first NOx catalyst and is configured to supply urea water to an exhaust emission flowing into the first NOx catalyst;
    a second supply valve that is located upstream of the second NOx catalyst and is configured to supply the urea water to the exhaust emission flowing into the second NOx catalyst;
    a urea water tank that is configured to store the urea water;
    a urea water supply path that is arranged to connect the urea water tank with each of the first supply valve and the second supply valve and includes a first supply path which only the urea water to be supplied to the first supply valve flows through and a second supply path which only the urea water to be supplied to the second supply valve flows through, wherein the second supply path has a larger capacity than capacity of the first supply path by a predetermined volume;
    a pump that is configured to pressure-feed the urea water in the urea water supply path;
    an acquirer that is configured to obtain a pressure value or variation per unit time in the urea water supply path or in the pump; and
    a controller that is configured to perform filling control of the urea water into the first and second supply valves and into the urea water supply path by operating the pump in a specified operating state and performing open-close control of the first supply valve and the second supply valve, wherein
    in the filling control, the controller pressure-feeds the urea water to the first supply valve and the first supply path by the pump operated in the specified operating state in a state that at least the first supply valve out of the first and second supply valves is opened, and closes the first supply valve based on the obtained pressure value or variation per unit time.

2. The urea water supply system according to claim 1, wherein the controller closes the first supply valve, when the pressure value or variation per unit time obtained by the acquirer during pressure-feeding of the urea water by the pump operated in the specified operating state in the state that at least the first supply valve is opened is increased from a previously obtained pressure value or variation per unit time.

3. The urea water supply system according to claim 1, further comprising
- a determiner that is configured to perform a determination process of determining whether either of the first supply valve and the first supply path is clogged, based on a pressure in the urea water supply path or in the pump during the filling control, wherein
- when the determiner determines that the first supply valve or the first supply path is clogged after the first supply valve is closed in the filling control, the controller reopens the first supply valve while operating the pump in the specified operating state.

4. The urea water supply system according to claim 3, wherein in the filling control, the controller pressure-feeds the urea water to the first supply valve, the first supply path, the second supply valve and the second supply path by the pump operated in the specified operating state in a state that both the first supply valve and the second supply valve are opened, and closes the first supply valve based on the pressure value or variation per unit time obtained by the acquirer, the determiner determines that the first supply valve or the first supply path is clogged when a pressure condition of urea water induced by valve-closing of the first supply valve continues for a predetermined time after valve-closing of the first supply valve, and
when the determiner determines that the first supply valve or the first supply path is clogged, the controller closes the second supply valve and reopens the first supply valve while operating the pump in the specified operating state.

5. The urea water supply system according to claim 3, wherein the first NOx catalyst and the second NOx catalyst are arranged in series along a flow of the exhaust emission in the exhaust passage of the internal combustion engine, and
the first NOx catalyst is placed in upstream of the second NOx catalyst.

\* \* \* \* \*